March 12, 1963 E. T. PLATZ 3,081,442
THREE CONTACT TWIST TYPE RECEPTACLE
Filed May 28, 1958 4 Sheets-Sheet 1
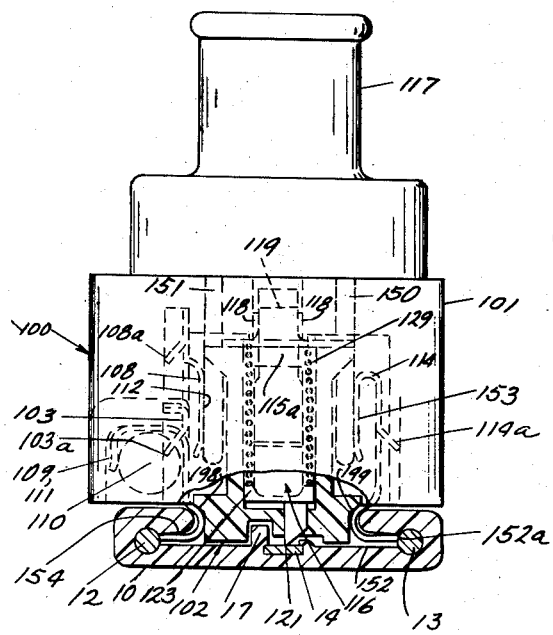
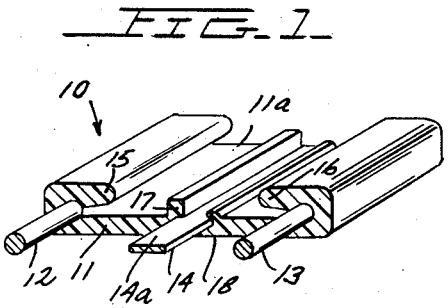
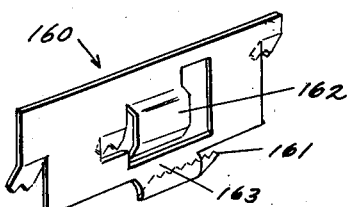
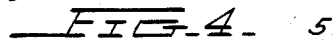
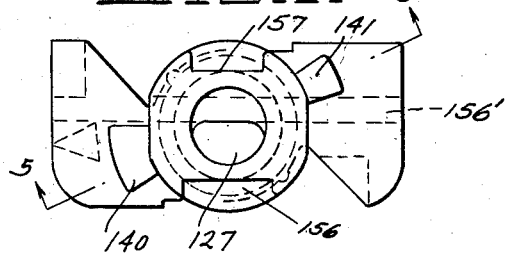
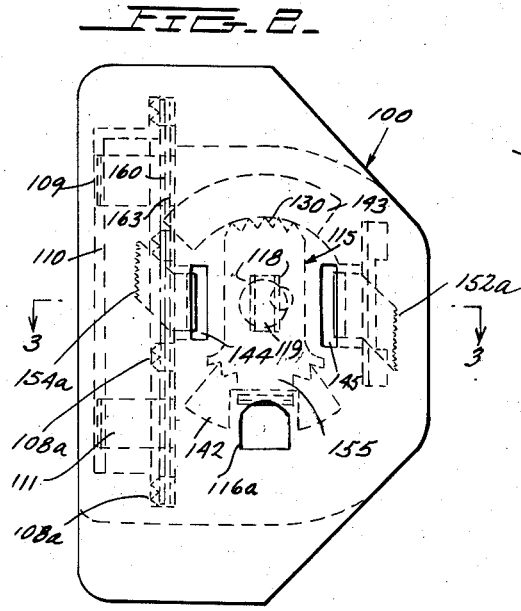
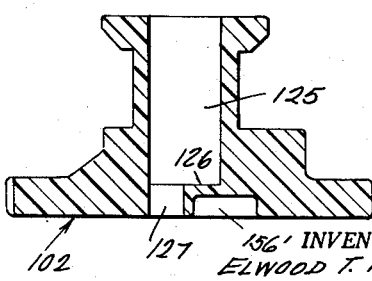
INVENTOR.
ELWOOD T. PLATZ
BY
ATTORNEYS

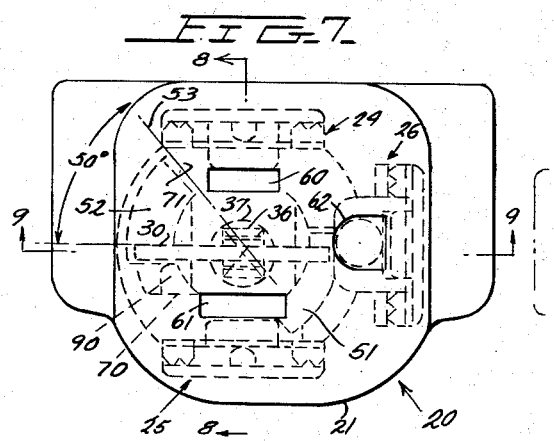
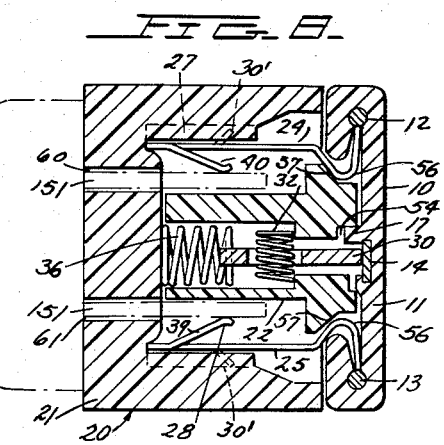
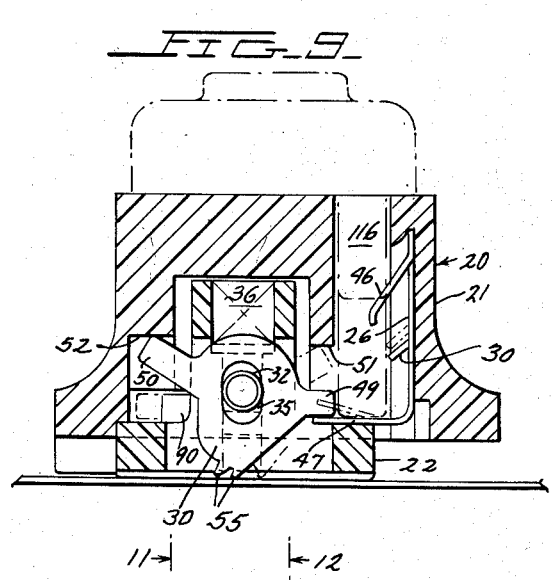
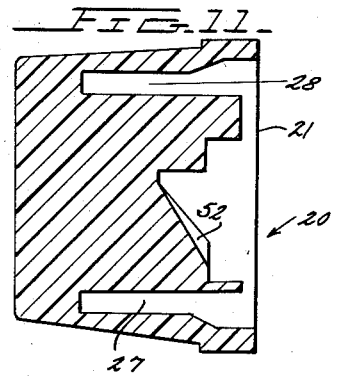
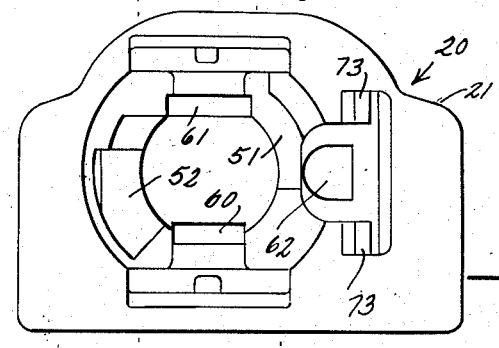
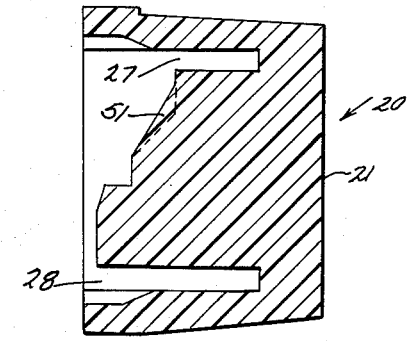
INVENTOR.
ELWOOD T. PLATZ
BY
ATTORNEYS March 12, 1963     E. T. PLATZ     3,081,442
THREE CONTACT TWIST TYPE RECEPTACLE
Filed May 28, 1958     4 Sheets-Sheet 3

INVENTOR.
ELWOOD T. PLATZ
ATTORNEYS

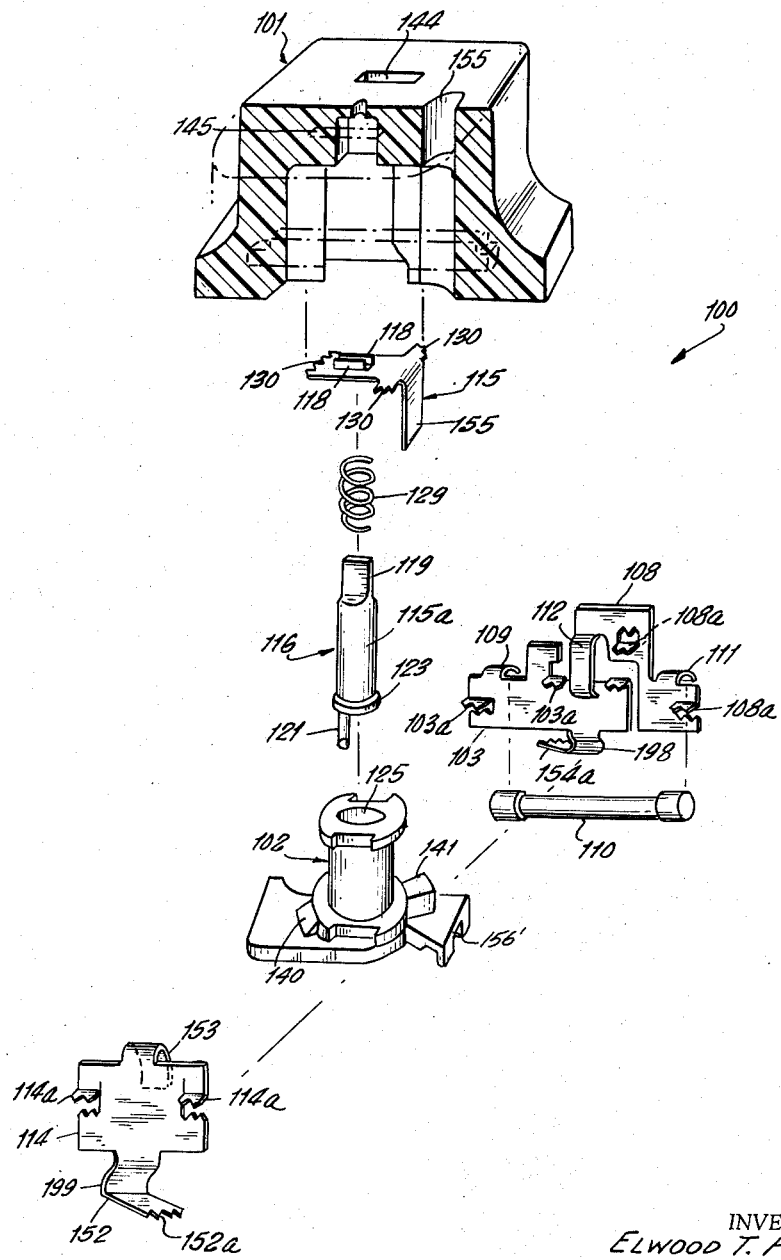

United States Patent Office 3,081,442
Patented Mar. 12, 1963

3,081,442
THREE CONTACT TWIST TYPE RECEPTACLE
Elwood T. Platz, Detroit, Mich., assignor to I-T-E Circuit Breaker Company, Philadelphia, Pa., a corporation of Pennsylvania
Filed May 28, 1958, Ser. No. 738,379
19 Claims. (Cl. 339—14)

The instant invention relates generally to electrical receptacles and more particularly to twist type receptacles which are adapted for connection to a three wire continuous outlet cable.

The first continuous outlet cable, such as the type disclosed in copending application (D–111–D–1) Serial No. 556,907 filed January 3, 1956, now Patent No. 2,924,804 and assigned to the assignee of the instant invention, have but two conductors, one designated the hot wire and the other designated the grounded or neutral wire. The popularity of power operated devices for the home has led to the development of a three wire continuous outlet cable which includes a conductor for grounding purposes. That is, many electrical appliances and portable tools are provided with a green wire known as an equipment grounding lead in addition to the two power leads. The equipment grounding provision is a safety feature to protect operating personnel from the danger of electrical shock.

However, a problem exists in obtaining a reliable contact to the equipment grounding conductor of the continuous outlet cable because the cable may be painted by the decorator or by the householder and especially since it is difficult to specify the number of coats of paint or types of paints that may be used. With a two wire continuous outlet cable a defective or faulty connection anywhere in the system is readily discernible by a lack of continuity since an applicance connected thereto will not operate. Except in the case of a short circuit to ground no particular danger exists. It simply means that there is no current supply to the appliance connected to the circuit. On the other hand, with a three wire continuous outlet cable the circuit through the equipment grounding conductor must be extremely and unusually reliable since a lack of continuity cannot be readily detected. Furthermore, a practical method of testing in the field is not available or convenient so that the grounding safety feature must be presumed when a receptacle is connected in a normal or casual way.

The receptacles of the instant invention are constructed so that the tip of the contact which engages the grounding conductor is pointed and is urged against the grounding conductor to effectively penetrate any coatings thereon. Then the sharp tip is scraped along the surface of the conductor to insure a sound and reliable electrical contact therewith.

This invention provides a reliable yet inexpensive three contact twist type receptacle. The contacts, engaged by the plug prongs, comprise lanced ears rather than being formed-over ears. Further, the receptacle includes an insert which may be constructed without a collar so that the mold that forms the insert need not have retracting die sections which would greatly limit the number of cavities in the mold. These two construction features result in an especially economical design.

Accordingly, a primary object of the instant invention is to provide a novel three contact twist type receptacle for a three wire continuous outlet cable.

Another object is to provide a three contact fusible receptacle to be used with the three wire continuous outlet cable.

Still another object is to provide a non-fusible three contact attachable receptacle to be used with a three conductor continuous outlet cable.

A further object is to provide a three contact receptacle that can neither be removed from nor mounted to a continuous outlet cable while a load connector plug is inserted in the receptacle.

A still further object is to provide a three contact twist type receptacle wherein the prong engaging contacts comprise lanced ears.

Yet another object is to provide a three contact receptacle that is especially inexpensive to construct by removing the necessity of utilizing retracting die sections, wherever possible, to form the molded members of the receptacle.

Still another object is to provide a three contact receptacle wherein the equipment grounding contact of the receptacle is biased toward the equipment grounding wire of the cable and is scraped along the wire as the receptacle is mounted to the cable so as to penetrate all layers of paint and dirt which may have accumulated on the wire.

These and other objects of this invention will become apparent after reading the following description and referring to the accompanying drawings in which:

FIGURE 1 is a perspective view of a section of three wire continuous outlet cable to which the receptacles of this invention may be mounted.

FIGURE 2 is a plan view of a three contact fusible detachable receptacle for a continuous outlet cable.

FIGURE 3 is a partial section through line 3—3 of FIGURE 2 looking in the direction of arrows 3—3 with the plug added.

FIGURE 4 is a bottom view of the insert of the receptacle of FIGURE 2.

FIGURE 5 is a section through line 5—5 of FIGURE 4 looking in the direction of arrows 5—5.

FIGURE 6 is a perspective view of a connector which may replace the fuse and fuse terminals of the receptacle of FIGURE 2.

FIGURE 7 is a plan view of another three contact twist type receptacle for mounting to a continuous outlet cable.

FIGURE 8 is a section taken through line 8—8 of FIGURE 7 looking in the direction of arrows 8—8.

FIGURE 9 is a section taken through line 9—9 of FIGURE 7 looking in the direction of arrows 9—9.

FIGURE 10 is a bottom view of the case of the receptacle of FIGURE 7.

FIGURE 11 is a section taken along line 11—11 of FIGURE 10 looking in the direction of arrows 11—11.

FIGURE 12 is a section taken through line 12—12 of FIGURE 10 looking in the direction of arrows 12—12.

FIGURE 14 is an exploded perspective of the embodiment illustrated in FIGURES 2 through 6.

Figure 13:
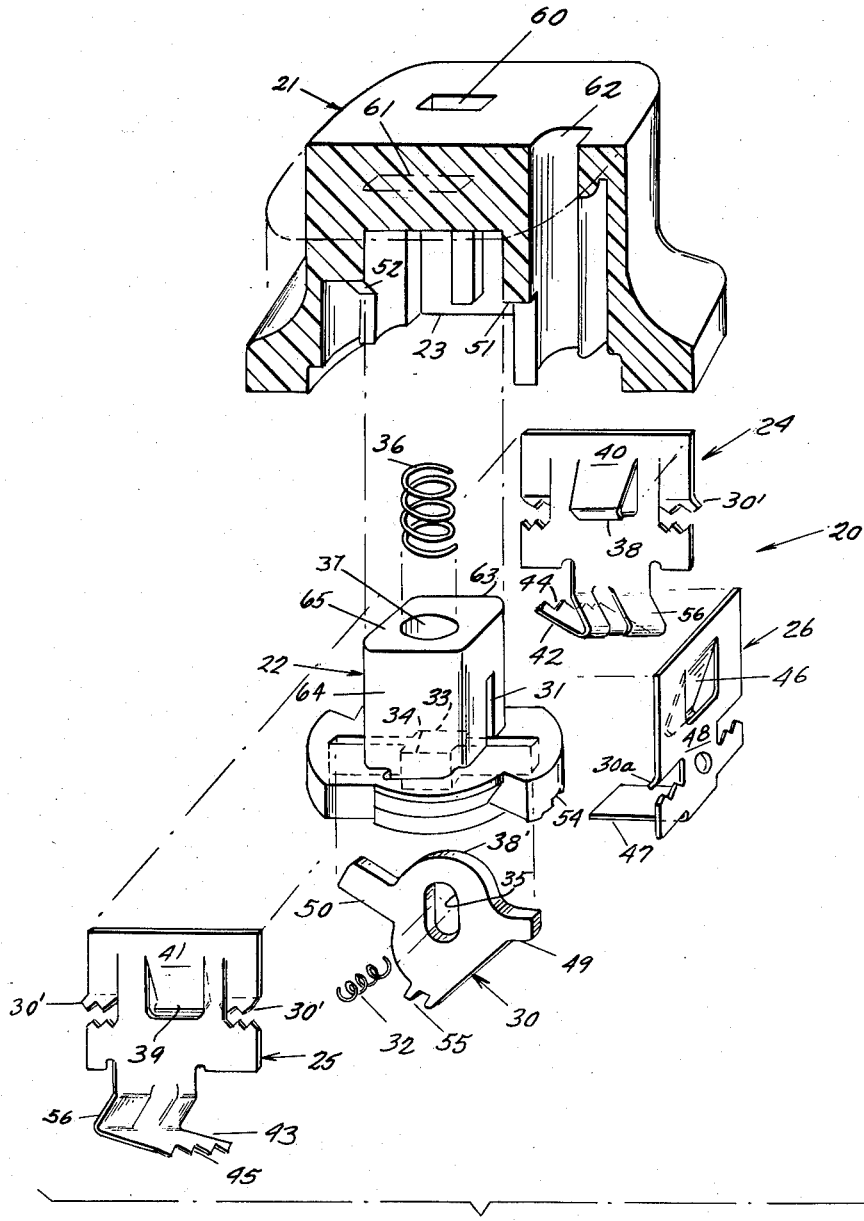
FIGURE 13 is an exploded perspective of the embodiment illustrated in FIGURES 7–12.

Referring to FIGURE 1, three wire cable 10 consists of a strip-like body 11 in which the conductors 12, 13 and 14 are partially embedded. The flat strip-like body 11 is constructed of a flexible dielectric material usually formed by extrusion. All three conductors 12, 13 and 14 may be extruded in place simultaneously with the forming of the body 11 or else suitable grooves may be formed in the body 11 as it is extruded, and later the conductors 12, 13 and 14 may be snapped into place while the extrusion is still hot. Upper conductor 12 is known as the hot wire, lower conductor 13 is known as the neutral or ground wire, and center conductor 14 is known as the equipment grounding wire or bus. Only the hot wire 12 and neutral wire 13 will normally carry load current.

Lips 15 and 16 extend inwardly from the edges of body 11 and partially overlie outside surface 11a and serve to protect the conductors 12 and 13 from injury and prevent persons from contacting a live wire and receiving an electrical shock. Rib 17 projects outwardly from front surface 11a of said cable 10 to serve as a polarizing means for receptacles 20 and 100, the construction and operation of which shall be hereinafter described, as they are mounted on the cable 10. Back surface 18 is placed flush against a mounting surface such as a wall or baseboard of a house.

Referring more particularly to FIGURES 2–6 and 14, the construction and operation of the fused detachable receptacle 100 which is to be used in conjunction with three wire cable 10 shall now be described. The receptacle 100 is adapted to receive a three prong plug 117 having a ground or neutral prong 150, a hot prong 151, and an equipment grounding prong 116.

The detachable receptacle 100 comprises a body or case, 101 preferably made of a plastic insulating material molded to shape. A ground or neutral contact 114 is mounted in the body 101 by an integrally formed barb 114a. The neutral contact 114 includes an extension 152 at one end having a serrated edge 152a which is used to contact neutral conductor 13 of cable 10 and at the other end is a formed over plug contactor 153 which is engaged by neutral prong 150 of the plug 117. Plug 117 is in turn electrically connected to a power consuming load.

A hot wire contact 103 is mounted in the body 101 by means of integrally formed barb 103a. One end of hot wire contact 103 is formed as clip 109 in which one end of cartridge fuse 110 is mounted. The other end of cartridge fuse 110 is mounted in clip 111. A hot plug contact 108 is mounted in the body 101 by integrally formed barb 108a. One end of hot plug contact 108 is connected to the clip 111 and the other end forms the plug contactor 112 which is engaged by prong 151 of plug 117.

An insert 102 shown in FIGURES 4 and 5, preferably made of a plastic insulating material molded to shape, is rotatably mounted in the receptacle body 101 and is maintained therein by the bulging section 198 and 199 of contacts 103 and 114. The equipment grounding contact 116 is slidably mounted in bore 125 of the insert 102. One end of equipment grounding contact 116, comprising a chisel pointed tip 121, projects out from the bottom of the receptacle 100 through a substantially semicircular opening 127 in the insert. The tip 121 is urged in this direction by compression spring 129, preferably made of berylium copper, as the spring bears against round shoulder 123 of the equipment grounding contact 116. Movement in this direction is limited by round shoulder 123 of the equipment grounding contact 116 as it engages surface 126 of the insert 102. The spring 129 slidably fits over cylindrical portion 115a of equipment grounding member 116.

The other end of spring 129 bears against member 115 which is rigidly mounted in the body 101 by integrally formed barbs 130. Member 115, FIGURES 2 and 14, forms plug contactor 155 which is contacted by the equipment grounding prong of plug 117 not shown. Also projecting from member 115 are ears 118 which serve to engage rectangular tang 119 which is at one end of the equipment grounding contact 116 so that the equipment grounding contact 116 will rotate in unison with the receptacle body 101.

Thus the electrical paths from the plug 117 to the three wire cable 10 are completed through the receptacle 100 as follows:

(1) Neutral prong 150 makes wiping contact with neutral plug contactor 153 of neutral contact 114. Then through the extension 152a of neutral contact 114 which makes contact with neutral conductor 13 of cable 10.

(2) Hot prong 151 makes wiping contact with hot plug contactor 112 which is connected to fuse clip 111. Then through fuse 110 to fuse clip 109 which is connected to one end of hot wire contact 103, through extension 154 which makes contact with hot wire conductor 12 of a continuous outlet cable 10.

(3) An equipment grounding prong, not shown, makes wiping contact with plug contactor 155, which is a part of member 115, in alignment with prong opening 116a through which the prong extends. Rectangular tang 119 electrically connects member 115 and grounding equipment contact 116 through ears 118 and a parallel path is formed by beryllium copper spring 129 between shoulder 123 of contact 116 and the lower surface of member 115. Then through the chisel pointed tip 121 of equipment grounding contact 116 that is scraped across the surface of equipment grounding conductor 14 of cable 10. Spring 129 urges chisel point tip 121 into butt contact with equipment grounding conductor 14.

Connecting receptacle 100 to cable 10 is accomplished by placing the receptacle 100 in a disconnect state which is accomplished by rotating the body 101 of the receptacle 100 approximately 45° counterclockwise, looking from the top, with respect to insert 102. The receptacle 100 is placed against the cable 10 with polarizing groove 156' of the insert 102 mating with polarizing projection 17 of the cable 10. The polarizing projection 17 is not centered between the lips 15 and 16, thus insuring that the receptacle 100 cannot be mounted upside down.

The body 101 of the receptacle 100 is then rotated clockwise until insert projections 140 and 141, strike surfaces 142 and 143 inside of the body 101. As the body 101 is rotated so are extensions 152 and 154 as well as chisel pointed tip 121 since the first two parts are mounted in the body 101 and the latter part is engaged by member 115, which is also secured in the body 101, to be rotated therewith. At this time extension 152 contacts neutral conductor 13, extension 154 contacts hot conductor 12, and chisel point 121 contacts equipment grounding conductor 14. As the body 101 is rotated the chisel point tip 121 scrapes along surface 14a of equipment grounding conductor 14 and under the influence of compression spring 129 is effective to penerate paint or any foreign matter on the conductor 14.

When the receptacle 100 is mounted on the cable 10 slots 156 and 157 of the insert 102 are aligned opposite prong openings 144 and 145 in the body 101. At times when the conventional plug 117 is inserted in the receptacle 100, the prongs 150 and 151 thereof extend through openings 144 and 145 and slots 156 and 157. If an attempt is made to disconnect the receptacle 100 from the cable 10, the body 101 must be rotated counterclockwise. But insert 102, being held stationary by polarizing projection 17, blocks rotary movement of body 101 while prongs 150 and 151 are located in slots 156 and 157 of the insert. Thus the receptacle 100 cannot be removed from the cable 10 while the plug 117 is inserted into the receptacle 100 since at this time the body 101 of the receptacle 100 cannot be rotated and any outward movement of the receptacle 100 is prevented by the extensions 152 and 154 being positioned behind lips 15 and 16.

Fusible receptacle 100 may readily be converted to a non-fusible receptacle by removing fuse clips 109 and 111, fuse 110, hot wire contact 103 and hot plug contact 108 and substituting a new part 160 (FIGURE 6) having a first section 161, identical to hot wire contact 103, and a second section 162, identical to hot plug contact 108, with the sections 161 and 162 joined by a third section 163.

Now, referring more particularly to FIGURES 7–13 where another embodiment of this invention is illustrated, three contact twist type receptacle 20 comprises a molded case 21 and a molded insert 22 mounted for limited rotation within recess 23 at the bottom of case 21. Hot, neutral, and equipment grounding contacts 24, 25, 26 respectively are disposed within case slots 27, 28, 29 respectively. Each contact 24, 25 is provided with barbs 30' and contact 26 with barbs 30a for anchorage to the case 21.

Contact member 30 is disposed within insert slot 31 and is mounted upon coil spring 32 for oscillation thereabout, of approximately 30°, by means to be hereinafter described. The ends of spring 32 are disposed within transverse extensions 33, 34 (FIGURE 13) of slot 31 while the center section is disposed within the vertically elongated aperture 35 of member 30. A compression spring 36 is disposed within insert bore 37 with the ends thereof bearing against the upper inside surface of case 21 and the rounded portion 38' of the upper edge of contact member 30.

Contact 30 is pivoted to insert 22 by means of bearing spring 32 and is guided by the walls of slot 31, in insert 22, through which actuator arms 49, 50 extend. This use of a spring as a bearing is unique in that it serves as an expandable pin. Contact 30 is then pushed upward until the ends of spring 32 are free to expand into transverse extensions 33, 34 of slot 31. The use of a spring 32 is in lieu of and is much more economical than a solid pin inserted and somehow secured in insert 22 through holes which would have to be drilled or otherwise fabricated.

Neutral contact 24 and hot contact 25 are identical members having bodies 40, 41 respectively, constructed of thin sheet resilient conducting material having lanced ears which form prong engaging contacts 38, 39, respectively. Wire engaging contacts 42, 43 extend at substantially right angles from bodies 40, 41 respectively. The wire engaging contacts 42, 43 are provided with serrated edges 44, 45 respectively which scrape across the cable wires 12, 13 when receptacle 20 is mounted to continuous outlet cable 10. It is to be noted that the lanced ear construction provides a considerable saving in cost over the formed over construction of the contact 114 (FIGURE 3). Inwardly bent portions 56 of contacts 24, 25 bear against circular flare 57, FIGURE 8, on insert 22 to retain insert 22 rotatably within case 21.

Equipment grounding contact 26 is similar in construction to contacts 24 and 25, having a lanced ear which forms prong contact 46 and a leg 47 bent at less than a right angle to body 48. Leg 48 is positioned for engagement by actuator arm 49 of contact member 30, in a manner to be hereinafter described. Barbs 30a of contact 26 engage the walls of case slots 73 to secure contact 26 within case 21.

Actuator arms 49, 50 of contact member 30 engage cam surfaces 51, 52 respectively of the inside of case 21. When receptacle 20 is installed on cable 10, case 21 is in a position rotated counterclockwise 50° from that indicated in FIGURE 7 in which position line 53 is parallel to the longitudinal center line of cable 10. Insert 22 remains in the position of FIGURES 7–9 since polarizing rib 17 is received by groove 54 in the bottom of the insert 22. Insert 22 is formed with block 90 which limits the rotation between case 21 and insert 22 to 50° by cooperating with stop walls 70, 71 of case opening 23.

When receptacle 20 is applied to cable 10 in the dismounting position, described in the preceding paragraph, contact member 30 is in its most counterclockwise position, indicated in phantom in FIGURE 9, as cam surface 52 engages actuator arm 50.

When case 21 is rotated clockwise through the previously mentioned 50° angle, contact member 30 will rotate 30° about spring 32 to the solid line position of FIGURE 9 since actuator arm 49 is urged downwardly by cam surface 51. Actuator arm 49 is now in engagement with leg 47 of equipment grounding contact 26. This 30° rotation of contact member 30 will cause knife-like serrated edge 55 to effectively cut through paint or other foreign matter which may have accumulated on wire 14.

Similarly, when case 21 is rotated 50° counterclockwise, as in removing receptacle 20 from cable 10, contact member 30 will operate counterclockwise about spring 32 as a center because of the engagement between actuator arm 50 and cam surface 52. Spring 36 provides the contact pressure between edge or sharp tip 55 and conductor 14 by urging contact member 30 out the bottom of insert 22 toward cable 10. Aperture 35 is elongated so that contact 30 may float downward to compensate for wear at edge 55 and manufacturing tolerances.

Prong engaging contacts 38, 39, 46 are positioned in alignment with case aperture 60, 61, 62 respectively. When receptacle 20 is mounted to cable 20, plug prongs 150, 151, 116' are entered through apertures 60, 61, 62, respectively, to engage contacts 38, 39, 46, respectively. In this position flat prongs 150, 151 are adjacent to flat sides 63, 64 respectively of insert 22 thereby blocking rotation of case 21 so that receptacle 20 cannot be dismounted from cable 10 with a load connected thereto. Similarly, when case 21 is rotated counterclockwise to the dismounting position insert 22 is positioned to block an engagement between prongs 150, 151 and contacts 38, 39, so that receptacle 20 cannot be mounted to cable 10 with a load connected thereto thereby preventing arcing at cable conductors 12—14.

It is to be noted that insert 22 is less expensive to construct than insert 102 of the first embodiment described since insert 22 does not require a collar at the upper end thereof as is required by insert 102 in order to prevent installation and removal of the receptacle from the continuous outlet cable. By eliminating the upper insert 22 may be formed without utilizing expensive molds having retractable sections.

Thus I have provided novel and economical constructions for three contact twist type receptacles which are to be used with continuous outlet cable having an equipment grounding conductor. My receptacles will provide reliable equipment grounding even though many layers of paint have been applied to the continuous outlet cable.

In the foregoing, I have described my invention only in connection with preferred embodiments thereof. Many variations and modifications of the principles of our invention within the scope of the description herein are obvious.

Accordingly, I prefer to be bound not by the specific disclosure herein but only by the appending claims.

I claim:

1. A removable receptacle adapted to be operatively connected to a three wire continuous outlet cable; said receptacle comprising a first, second and third contact, an insulating body, an insulating insert; said first and second contacts being secured in said body; said third contact being positioned within an opening of said insert; said insert being rotatably secured within said body; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; a contactor means, including a contactor portion, operatively connecting said third contact to said body to move said third contact in unison with said body; each of said first and second contacts including extensions at a first end thereof engageable with current carrying conductors of said continuous outlet cable; said third contact including a chisel point tip at one end thereof; a biasing means operatively positioned to engage said third contact and urge said chisel point tip beyond the confines of said insert into engagement with an equipment grounding bus of said continuous outlet cable; said insert including a polarizing groove adapted to cooperate with a polarizing rib of said continuous outlet cable; a first fuse clip secured to a second end of said second contact; a second fuse secured to said second prong engageable means; said second fuse clip being positioned within the confines of said body and secured thereto.

2. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being partially positioned within said insert and having a portion extending beyond the bottom of said receptacle; said body being operatively connected to said third contact to impart movement thereto with respect to said insert when said body is moved with respect to said insert.

3. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being partially positioned within said insert; said body being operatively connected to said third contact to impart movement thereto with respect to said insert when said body is moved with respect to said insert; said third contact including a knife-like tip projected beyond the confines of said insert at the bottom of said receptacle and operatively positioned for engagement with an equipment grounding bus of said continuous outlet cable.

4. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being partially positioned within said insert; said body being operatively connected to said third contact to impart movement thereto with respect to said insert when said body is moved with respect to said insert; said third contact including a knife-like tip projected beyond the confines of said insert at the bottom of said receptacle and operatively positioned for engagement with an equipment grounding bus of said continuous outlet cable; said tip being scraped across said grounding bus when said receptacle is positioned for securement to said cable and said body is moved with respect to said insert.

5. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being partially positioned within said insert; said body being operatively connected to said third contact to impart movement thereto with respect to said insert when said body is moved with respect to said insert; said third contact including a knife-like tip projected beyond the confines of said insert at the bottom of said receptacle and operatively positioned for engagement with an equipment grounding bus of said continuous outlet cable; said tip being scraped across said grounding bus when said receptacle is positioned for securement to said cable and said body is moved with respect to said insert; a biasing means operatively positioned in engagement with said third contact to urge said tip beyond the confines of said insert into engagement with the cable equipment grounding bus.

6. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being partially positioned within said insert and having a portion extending beyond the bottom of said receptacle; said body being operatively connected to said third contact to impart movement thereto with respect to said insert when said body is moved with respect to said insert; both said first and said second contacts having a lanced ear forming their associated prong engageable means.

7. A removable receptacle adapted to be operatively conected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically conected to said first, said second and said third contacts, respectively; said first and second contacts being secured within said body and having portions extending beyond the confines thereof engageable with a neutral and a hot bus respectively, of said continuous outlet cable; said third contact being partially positioned within said insert and having a portion extending beyond the bottom of said receptacle; said body being operatively connected to said third contact to impart movement thereto with respect to said insert when said body is moved with respect to said insert; both said first and said second contacts having a lanced ear forming their associated prong engageable means; a fourth contact secured within said body and operatively positioned for engagement by said third contact; said fourth contact having a lanced ear forming said third prong engageable means.

8. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions etxending beyond the confines thereof engageable with a neutral and a hot bus respectively, of said continuous outlet cable; said third contact being positioned within said insert with a bus engaging tip of said third contact extending beyond said insert; said body being operatively connected to said third contact to impart movement thereto with respect to said insert when said body is rotated with respect to said insert; said third contact comprising a thin member mounted for rockable movement about an axis normal to the plane of said thin member whereby said bus engaging tip is drawn against an equipment grounding bus of a cable to which said receptacle is mounted.

9. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being positioned within said insert with a bus engaging tip of said third contact extending beyond said insert; said body being operatively connected to said third contact to impart movement thereto with respect to said insert when said body is rotated with respect to said insert; said third contact comprising a thin member mounted for rockable movement about an axis normal to the plane of said thin member whereby said bus engaging tip is drawn against an equipment grounding bus of a cable to which said receptacle is mounted; said third contact including a pair of actuator arms extending beyond said insert in opposite directions; said arms being in operative engagement with cam surfaces of said body communicating with said recess whereby movement about said axis is imparted to said third contact by movement of said body relative to said insert.

10. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body; and having portions extending beyond the confines thereof engageable with a neutral and a hot bus respectively, of said continuous outlet cable; said third contact being positioned within said insert with a bus engaging tip of said third contact extending beyond said insert; said body being operatively connected to said third contact to impart movement thereto with respect to said insert when said body is rotated with respect to said insert; said third contact comprising a thin member mounted for rockable movement about an axis normal ot the plane of said thin member whereby said bus engaging tip is drawn against an equipment grounding bus of a cable to which said receptacle is mounted; said axis comprising a coil spring disposed within said insert.

11. A removable receptacle adapted to be operatively connected to a three wire continuous outlet cable; said receptacle comprising a first, a second and a third contact, an insulating body, an insulating insert; said insert being entered into a recess of said body and mounted for limited movement with respect thereto; a first, a second, and a third prong opening in a surface of said body defining the top of said receptacle; a first, a second and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; said first and second contacts being secured within said body and having portions extending beyond the confines thereof engageable with a neutral and a hot bus respectively, of said continuous outlet cable; said third contact being positioned within said insert with a bus engaging tip of said third contact extending beyond said insert; said body being operatively connected to said third contact to impart movement thereto with respect to said insert when said body is rotated with respect to said insert; said third contact comprising a thin member mounted for rockable movement about an axis normal to the plane of said thin member whereby said bus engaging tip is drawn against an equipment grounding bus of a cable to which said receptacle is mounted; said axis comprising an element entered through an elongated opening in said third contact.

12. In combination an insulating insert member, a thin contact member, and a spring means; said insert member having a narrow slot and transverse recesses communicating with said slot; said contact member being partially disposed within said slot; said spring means being entered through an aperture in said contact member; said spring means having the ends thereof disposed within said recesses to thereby rotatably secure said contact member to said insert member; means movable with respect to said insert member operatively engageable with said contact member to rotate same about said spring means as an axis; and another means operatively connecting said last recited means to said insert; said movable means being adapted to move in a plane transverse to the plane of rotation of said contact member.

13. In combination an insulating insert member, a thin contact member, and a spring means; said insert member having a narrow slot and transverse recesses communicating with said slot; said contact member being partially disposed within said slot; said spring means being entered through an aperture in said contact member; said spring means having the ends thereof disposed within said recesses to thereby rotatably secure said contact member to said insert member; said contact member including a knife-like edge extendable beyond the confines of said slot; means movable with respect to said insert member operatively engageable with said contact member to rotate same about said spring means as an axis; and another means operatively connecting said last recited means to said insert; said movable means being adapted to move in a plane transverse to the plane of rotation of said contact member.

14. In combination an insulating insert member, a thin contact member, and a spring means; said insert member having a narrow slot and transverse recesses communicating with said slot; said contact member being partially disposed within said slot; said spring means being entered through an aperture in said contact member; said spring means having the ends thereof disposed within said recesses to thereby rotatably secure said contact member to said insert member; said contact member including a knife-like edge extendable beyond the confines of said slot and positionable to engage means external of the combination; said contact member also including a pair of arms extending in opposite directions beyond the confines of said slot; means movable with respect to said insert member operatively engageable with said arms for rotation of said contact member about said spring means as an axis; and another means operatively connecting said last recited means to said insert; said movable means being adapted to move in a plane transverse to the plane of rotation of said contact member.

15. In combination an insulating insert member, a thin contact member, and a spring means; said insert member having a narrow slot and transverse recesses commuicating with said slot; said contact member being partially disposed within said slot; said spring means being entered through an aperture in said contact member; said spring means having the ends thereof disposed within said recesses to thereby rotatably secure said contact member to said insert member; said contact member including a knife-like edge extendable beyond the confines of said slot; said aperture being elongated; means movable with respect to said insert member operatively engageable with said contact member to rotate same about said spring means as an axis; said movable means being adapted to move in a plane transverse to the plane of rotation of said contact member.

16. A removable receptacle adapted to be operatively connected to a three wire continuous outlet cable; said receptacle comprising a first, second and third contact, an insulating body, an insulating insert; said first and second contacts being secured in said body; said third contact being positioned within an opening of said insert; said insert being rotatably secured within said body; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; means, including a contactor portion, operatively connecting said third contact to said body to move said third contact in unison with said body, each of said first and second contacts including extensions at a first end thereof engageable with current carrying conductors of said continuous outlet cable; said third contact including a tip at one end thereof engageable with an equipment grounding bus of said continuous outlet cable.

17. A removable receptacle adapted to be operatively connected to a three wire continuous outlet cable; said receptacle comprising a first, second and third contact, an insulating body, an insulating insert; said first and second contacts being secured in said body; said third contact being positioned within an opening of said insert; said insert being rotatably secured within said body; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; means, including a contactor portion, operatively connecting said third contact to said body to move said third contact in unison with said body; each of said first and second contacts including extensions at a first end thereof engageable with current carrying conductors of said continuous outlet cable; said third contact including a chisel point tip at one end thereof; a biasing means operatively positioned to engage said third contact and urge said chisel point tip beyond the confines of said insert into engagement with an equipment grounding bus of said continuous outlet cable.

18. A removable receptacle adapted to be operatively connected to a three wire continuous outlet cable; said receptacle comprising a first, second and third contact, an insulating body, an insulating insert; said first and second contacts being secured in said body; said third contact being positioned within an opening of said insert; said insert being rotatably secured within said body; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; means, including a contactor portion, operatively connecting said third contact to said body to move said third contact in unison with said body; each of said first and second contacts including extensions at a first end thereof engageable with current carrying conductors of said continuous outlet cable; said third contact including a chisel point tip at one end thereof; a biasing means operatively positioned to engage said third contact and urge said chisel point tip beyond the confines of said insert into engagement with an equipment grounding bus of said continuous outlet cable; said insert including a polarizing groove adapted to cooperate with a polarizing rib of said continuous outlet cable.

19. A removable receptacle adapted to be operatively connected to a three wire continuous outlet cable; said receptacle comprising a first, second and third contact, an insulating body, an insulating insert; said first and second contacts being secured in said body; said third contact being positioned within an opening of said insert; said insert being rotatably secured within said body; a first, a second, and a third prong opening in a surface of said body defining the top of said receptacle; a first, a second, and a third prong engageable means in alignment with said first, said second, and said third prong openings, respectively, so as to be engageable with plug prongs inserted through the respective prong openings; said first, said second, and said third prong engageable means being insulated from each other and being electrically connected to said first, said second and said third contacts, respectively; means, including a contactor portion, operatively connecting said third contact to said body to move said third contact in unison with said body; each of said first and second contacts including extensions at a first end thereof engageable with current carrying conductors of said continuous outlet cable; said third contact including a chisel point tip at one end thereof; a biasing means operatively positioned to engage said third contact and urge said chisel point tip beyond the confines of said insert into engagement with an equipment grounding bus of said continuous outlet cable; a first fuse clip secured to a second end of said second contact; a second fuse clip secured to said second prong engageable means; said second fuse clip being positioned within the confines of said body and secured thereto; two slots in said insert; said fuse and said second body opening being in alignment with said slots when said receptacle is secured to said continuous outlet cable and being out of alignment when said receptacle is in a disconnect state.

References Cited in the file of this patent

UNITED STATES PATENTS

| | | |
|---|---|---|
| 1,512,816 | Benjamin | Oct. 21, 1924 |
| 1,770,377 | Wolfe | July 15, 1930 |
| 2,076,558 | Hartman et al. | Apr. 13, 1937 |
| 2,183,911 | Howell | Dec. 19, 1939 |
| 2,309,972 | Messing | Feb. 2, 1943 |
| 2,399,408 | Walk | Apr. 30, 1946 |
| 2,566,805 | Lavender | Sept. 4, 1951 |
| 2,609,415 | Benander et al. | Sept. 2, 1952 |
| 2,743,423 | Parks | Apr. 24, 1956 |
| 2,799,009 | Benander | July 9, 1957 |
| 2,856,592 | Carlson | Oct. 14, 1958 |
| 2,924,802 | Platz et al. | Feb. 9, 1960 |
| 2,943,292 | Herrmann et al. | June 28, 1960 |
| 2,946,037 | Platz et al. | July 19, 1960 |

FOREIGN PATENTS

| | | |
|---|---|---|
| 538,387 | Belgium | June 15, 1955 |
| 668,716 | Germany | Dec. 8, 1938 |
| 1,758 | Great Britain | Apr. 26, 1876 |